United States Patent [19]

Steger

[11] Patent Number: 4,556,927
[45] Date of Patent: Dec. 3, 1985

[54] INTRINSICALLY SAFE SIGNAL COUPLER

[75] Inventor: James O. Steger, Greensboro, N.C.

[73] Assignee: Gilbarco, Inc., Greensboro, N.C.

[21] Appl. No.: 484,986

[22] Filed: Apr. 14, 1983

[51] Int. Cl.$^4$ ............................................. H05F 1/00
[52] U.S. Cl. ................................... 361/215; 73/290 V
[58] Field of Search ................ 361/42, 215; 336/96; 73/290 V

[56] References Cited

U.S. PATENT DOCUMENTS

| | | | |
|---|---|---|---|
| 2,787,160 | 4/1957 | Van Valkenburg | 73/290 V |
| 3,931,601 | 1/1976 | Anderson | 361/46 X |
| 4,009,419 | 2/1977 | Ligman | 361/91 |
| 4,130,018 | 12/1978 | Adams et al. | 73/290 V |
| 4,222,089 | 9/1980 | MacAskill, Jr. et al. | 361/331 X |
| 4,231,112 | 10/1980 | Massa | 367/158 |
| 4,364,117 | 12/1982 | Snow | 367/152 |
| 4,427,132 | 1/1984 | Thomson | 73/290 V X |

FOREIGN PATENT DOCUMENTS 0027021  2/1983  Japan ........................... 73/290 V Primary Examiner—Reinhard J. Eisenzopf
Attorney, Agent, or Firm—Kenneth Watov

[57] ABSTRACT

Energy limiting, bidirectional signal passage, bandpass filtering, and DC isolation is provided in an intrinsically safe manner, for electrical signals coupled between various electrical equipment located both outside and within a storage tank containing highly combustible matter, for example, via apparatus including a ferrite core transformer potted within a cavity of an explosion proof housing mounted upon a wall of the tank, whereby one winding of the transformer is connected to the outside equipment, and another winding of the transformer is connected to equipment located within the tank.

12 Claims, 3 Drawing Figures

INTRINSICALLY SAFE SIGNAL COUPLER

The field of the present invention relates generally to signal couplers, and more particularly to signal couplers for passing electrical signals in an intrinsically safe manner between equipment contained in a safe atmosphere and other electrical equipment contained in an area including highly combustible matter.

It is often required that electrical signals be bidirectionally transferred between electrical equipment that are remotely located from one another. When the electrical equipment is located in an area containing highly combustible matter, it is required that the level of the associated electrical energy be maintained below the ignition point of the combustible matter. For example, all electrical signals passing through areas containing explosive vapors, such as the interior of a gasoline storage tank, must be held to energy levels within the tank for ensuring that the vapors cannot be ignited by the electrical signals or current being conducted through the wires. Also, the vapors must be isolated from areas of high electrical energy in a manner to provide "an intrinsically safe" system. One way to provide such intrinsic safety is to limit to a safe level the electrical energy that is permitted to be carried by the wires enclosed within the unsafe zone or area. Known "safe electrical coupling" for providing the bidirectional flow of electrical signals from an unsafe zone or area to a safe zone or area often include very "lossy" resistor networks. Since these networks tend to reduce all electrical signals regardless of frequency to very low levels, very expensive detection circuitry is required to detect the signals which are transmitted back from the unsafe zone into the safe zone for monitoring purposes, for example.

Many different systems have been developed for limiting the amplitude or energy content of electrical signals being transferred from one point to another, or between different components of an electrical system. In Buckley U.S. Pat. No. 1,586,876, a transformer is connected between a signal source and a telephone receiver, for preventing low frequency energy, such as line current, from passing through to the receiver where it could cause an "acoustic shock" to a person using the telephone. Also, the telephone user is protected against electrical shock that may result from permitting line current to pass through to the receiver. The material of the transformer is fabricated from permalloy, a very highly electrically conductive material. Accordingly, it is possible in the event of shorted windings on the transformer for unwanted currents to flow therebetween via the conductive core.

Mathews et al. U.S. Pat. No. 3,202,876, Lipnitz U.S. Pat. No. 3,416,035, and Zocholl U.S. Pat. No. 3,434,011, each teach the use of the saturation characteristics of a transformer or tranformers to limit the transfer of energy between primary and secondary windings of the transformers. Kobayashi U.S. Pat. No. 3,683,271, teaches the use of a toroid transformer for passing 60 Hz line current, while acting as a high-frequency filter for blocking AC voltages having frequencies greater than powerline frequencies.

The previously mentioned prior patents are not concerned with "intrinsic safety", that is with both ensuring that electrical energy passed into a storage tank containing highly flammable matter such as gasoline, will not ignite the matter or cause explosion, and that such flammable matter does not escape into areas of high level electrical energy which could cause ignition. The present invention includes a toroid transformer consisting of a toroid of substantially non-conductive ferrite material "potted within" a cavity of housing means mounted upon a storage tank, for example. The potting material provides a barrier in conjunction with the housing means for preventing explosive vapors from reaching the primary winding side of the toroid transformer or entering into the safe atmosphere surrounding the storage tank. In turn, the non-conductive core of the toroid transformer provides for DC electrical isolation between the secondary winding of the transformer which is electrically connected to equipment within the tank, and the primary winding of the transformer which is electrically connected to equipment outside of the tank. In addition, the toroid core transformer is designed for providing bidirectional coupling of electrical signals between the primary and secondary windings, with substantially no attenuation, for signals having frequencies within a particular frequency band, and attenuating signals having frequencies outside of the band. Also, the transformer design provides for limiting the level of energy of signals transferred from the primary to the secondary windings of the transformer.

In the drawings, wherein like elements have the same reference designation:

Figure 1:
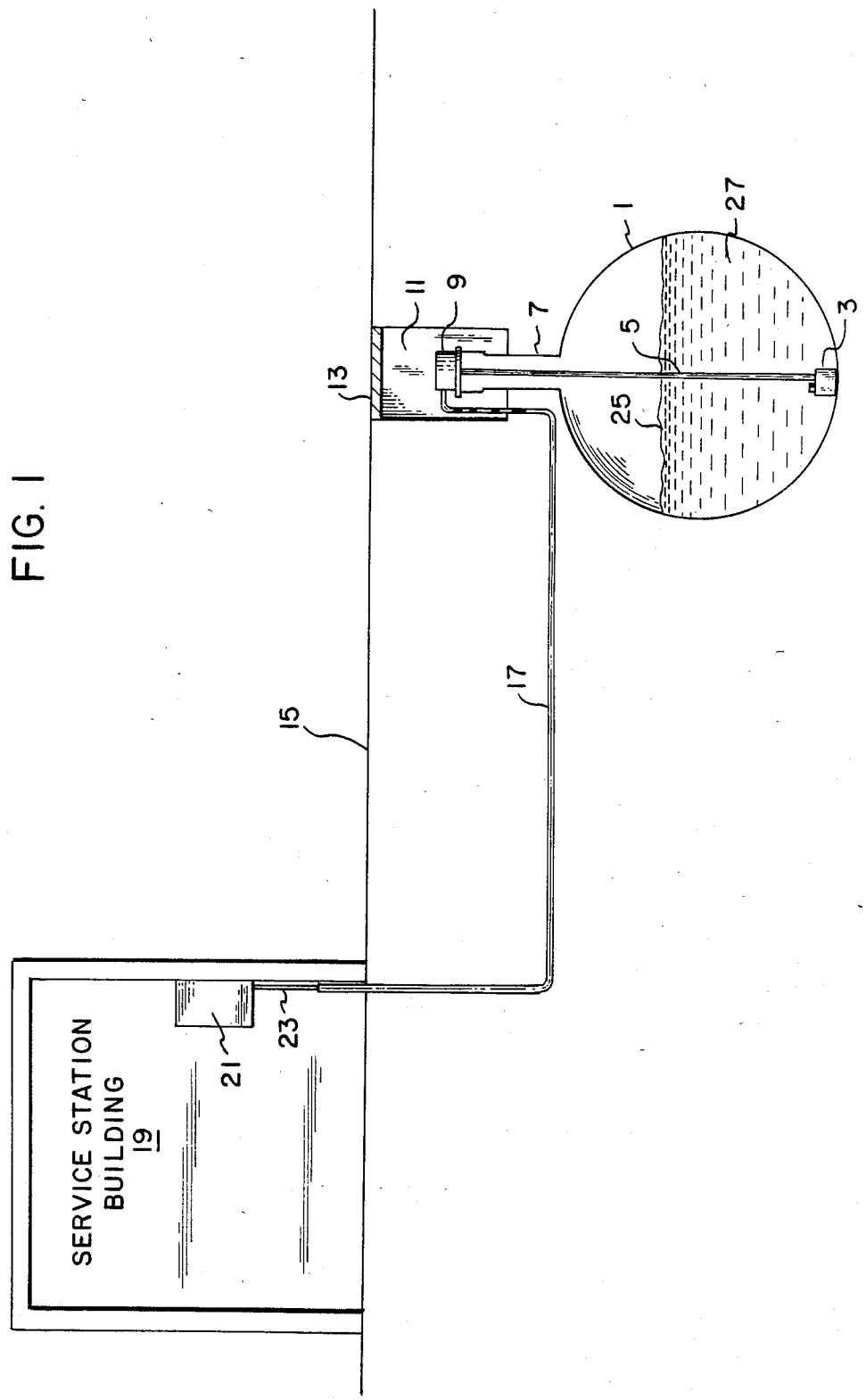
FIG. 1 is a cutaway pictorial diagram showing the use of one embodiment of the present invention in a system for providing remote readout of the volume or level of gasoline contained in an underground storage tank.

One use for the present invention is shown in FIG. 1, for example. An underground gasoline storage tank 1 includess an ultrasonic transducer 3 located near the bottom of the tank via a probe 5 extending through a standpipe 7 located at the top of the tank 1, to an explosion proof housing 9 mounted upon the top of the standpipe 7. Physical access to the housing 9 is provided by a manhole 11 normally sealed by a manhole cover 13 at ground or pavement level. Ground level is represented by the line 15. An underground conduit 17 is connected between the housing 9 and a service station building 19 in which an electronic console 21 is located. A coaxial cable 23 contained within conduit 17 is connected between the console 21 and the interior of the housing 9. The console 21 includes an electronic controller (not shown) for transmitting electrical signals to the transducer 3, for exciting the transducer 3 to emit ultrasonic energy into the interior of the tank 1, causing the ultrasonic energy to be reflected from the surface 25 of the gasoline 27, in this example, stored in the tank. As is typical in ultrasonic systems, a portion of the reflected energy is detected by the transducer 3, which converts this energy into electrical energy and sends it back to a receiver (not shown) section of the controller 21. The controller 21 automatically calculates the time for a particular ultrasonic wave to leave the transducer 3 and be reflected back from the surface 25 of the gasoline 27 to the transducer 3, for providing a readout of the level of gasoline in the tank 1, in this example. In such a system, since the gasoline fumes developed in the tank 1 are highly explosive, it is required that any electrical energy being conducted within the tank be maintained at an energy level substantially below the level of energy required for igniting the gasoline fumes, in order to prevent a fire or explosion. It is a requirement of the Underwriters' Laboratory that all electrical wiring within areas of potentially explosive vapors or highly combustible matter be contained therein in an explosion proof manner, ensuring that the area is maintained "intrinsically safe."

Figure 2:
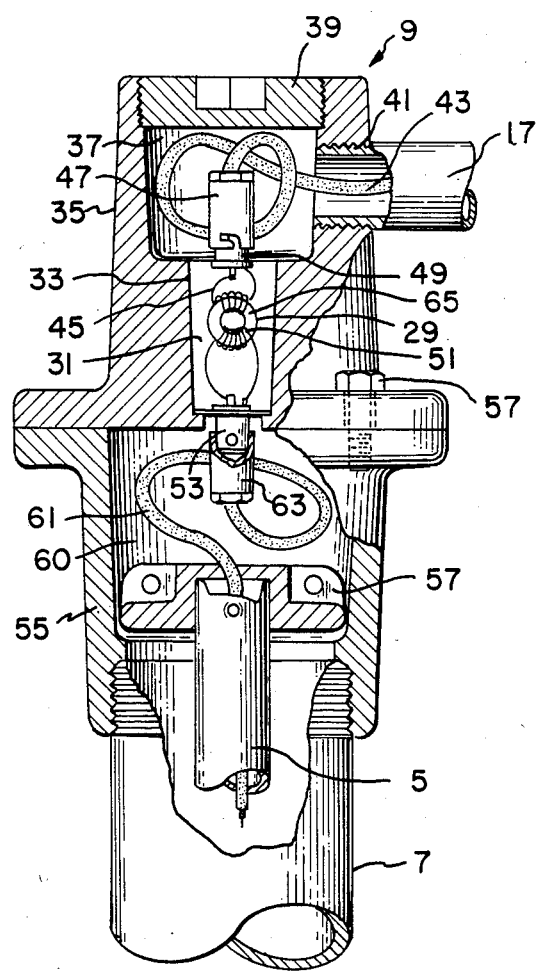
FIG. 2 is a partial cutaway view of one embodiment of the present invention.

The present inventor discovered that via the combination of elements shown in FIG. 2, intrinsically safe signal coupling is provided between equipment remote from a hazardous area or zone containing combustible matter and other equipment located in a relatively safe zone. As shown, a toroid core transformer 29 is surrounded by an appropriate potting material 31 (an epoxy imperious to hydrocarbon vapors, in this illustration) within a cavity 33 of a barrier head casting 35, in this example. The lower cavity 33 opens into a larger upper cavity 37 of the barrier head 35. Access to this upper cavity 37 is through a threaded cover 39. The conduit 17 connects to the barrier head 35 via a threaded hole 41, as shown. A coaxial cable 43 is connected between the controller 21 and a primary winding 45 of toroid transformer 29. The conduit 17 carries the coaxial cable 43 between its connection points. In this example, the coaxial cable 43 terminates to a female bayonet connector 47, the latter mating to a male bayonet connector 49 embedded within the potting material 31, as shown. The primary winding 45 of toroid transformer 29 is connected to the male bayonet connector 49. A secondary winding 51 of toroid transformer 29 is connected to another male bayonet connector 53, the latter being also rigidly mounted within the potting material 31, as shown.

A standpipe head 55 is threadably mounted or coupled to the top of standpipe 7 of the tank 1, and bolted to the barrier head 35, as shown, via bolts 57 (one of which is shown). An interior cavity of the standpipe head 55 includes an upper support or retainer 57 for securing a probe tube 5 within the standpipe 7. In this example, a coaxial cable 61 is connected between the transducer 3 and the interior cavity 60 of standpipe head 55 within the probe tube 59. A female bayonet connector 63 is used to connect the coaxial cable 61 to the male bayonet connector 53, for providing electrical connection between the cable 61 and the secondary winding 51 of toroid transformer 29.

The barrier head 35, including the potted cavity 33, prevents combustible vapors from escaping from the interior of the tank 1 to the atmosphere, in this example. In the preferred embodiment of the invention, the barrier head 35 is made explosion proof. As will be described in greater detail, the toroid transformer 29 limits the level of energy of signals passed from the primary winding 45 to the secondary winding 51 to safe levels relative to that required for igniting gasoline vapors.

In this example, the controller 21 produces a low power 1.0 MHz sinusoidal waveform for transmittal to the transducer 3. The present inventor chose ferrite as the material for the toroid core 65 of transformer 29. The ferrite material of the core 65 exhibits an extremely high electrical resistance, making the core substantially an insulator, thereby providing DC electrical isolation between the primary winding 45 and the secondary winding 51. It was determined that the low power 1.0 MHz sinusoidal waveform should pass substantially unattenuated from the primary winding 45 to the secondary winding 51. Accordingly, the bandpass frequency characteristic for the toroid transformer 29 is centered about 1.0 MHz in frequency, and the turns ratio between the primary winding 45 and secondary winding 51 is unity or 1:1. In this example, the primary and secondary windings 45, 51, respectively, were each made ten turns (5 of each being bifilar) and separated from one another with maximum physical separation, as shown. Through the combination of the extremely high internal electrical resistance of the ferrite toroid core 65, the maximum physical separation between the primary and secondary windings 45, 51, and the use of a very high resistance potting material 31, an extremely high degree of DC electrical isolation is provided between the windings 45, 51, while allowing for substantially unattenuated bidirectional signal transfer therebetween for signals having frequencies in the pass band.

The present inventor recognized that toroid cores generally have a very "tight" enclosed magnetic field, and that the only practical way of inducing a strong magnetic field therein is via windings such as the primary and secondary windings 45 and 51, respectively. Energy calculations for a toroid core transformer such as transformer 29, are made using the formula shown in equation 1 below:

$$B_m = \frac{E_{rms}(10^5)}{4.44 A_e N f} + \frac{I_{dc} A_1 N}{A_e(10^5)}, \quad (1)$$

wherein $A_e$ is the core 65 cross-sectional area in centimeters squared, $A_1$ is the inductive index in microhenrys per 100 turns, $B_m$ is the magnetic flux in kilogauss (in this example—saturating flux from the core manufacturer's specifications), $E_{rms}$ is the RMS voltage level of the signal applied to the primary winding 45, f is the frequency of the desired single in Hertz, $I_{dc}$ is the current in Amperes, and N is the number of turns on the primary winding 45 of the toroid transformer 29.

As indicated, equation (1) includes a frequency term "f", which translates to the number of flux reversals per second that the core 65 undergoes when a sinusoidal signal is applied to the primary winding 45. Assume in this example that the frequency is 1.0 MHz, and that calculations are scaled to 1 flux reversal. Also, assume that the impedances in the system are matched for maximum energy transfer. Energy is defined as shown below in equation 2:

$$\text{Energy} = \frac{E_{rms} I_{dc}}{f} \text{ joules/flux reversal} \quad (2)$$

One method of solving equation (2) is by using an iterative process, whereby $E_{rms}$ and $I_{dc}$ are adjusted for obtaining "hard" core saturation for core transformer 29 ($B_{max}$) is made greater than or equal to the manufacturer's specification), and a maximum power transfer between the primary winding 45 and secondary winding 51 is strived for (this represents a good impedance match therebetween). For purposes of illustration, assume that a ferrite core is chosen for providing the core 65. Further assume for a core transformer 29 of interest that $A_e = 0.128$ centimeters squared, $N = 10$ turns (5 turns Bifilar), f is $10^6$ Hz or 1.0 MHz, $A_1$ is $6.9 \times 10.2$ mh/1000 turns, and that for the core 29 $B_{max}$ is 3.8 kilogauss. Assume further that for a first iteration $E_{rms}$ is 40 volts, and $I_{dc}$ is 0.6 ampere, for the maximum signal obtainable from the controller 21. Using these specifications and equation 1, the computed $B_{max}$ is equal to 3.9 kilogauss, indicating a highly saturated core for providing a maximum energy transfer per flux reversal. From equation (2) the energy level for this first iteration is equal to 24 microjoules per flux reversal. If one performs an additional iteration and optimization for $E_{rms}=100$ volts, and $I_{dc}=0.4$ ampere, the energy transfer is found to be 40 microjoules per flux reversal. For this example, the calculations project a maximum energy transfer that is at least an order of magnitude under the Underwriters Laboratories' limits for electrical energy permissible within a gasoline storage tank. The inventor experimentally confirmed these mathematical results. It should be noted that as the voltage $E_{rms}$ is raised, the pulse width that the core 29 can transfer narrows, thereby maintaining a very low energy transfer equivalent to or less than 50 microjoules.

Figure 3:
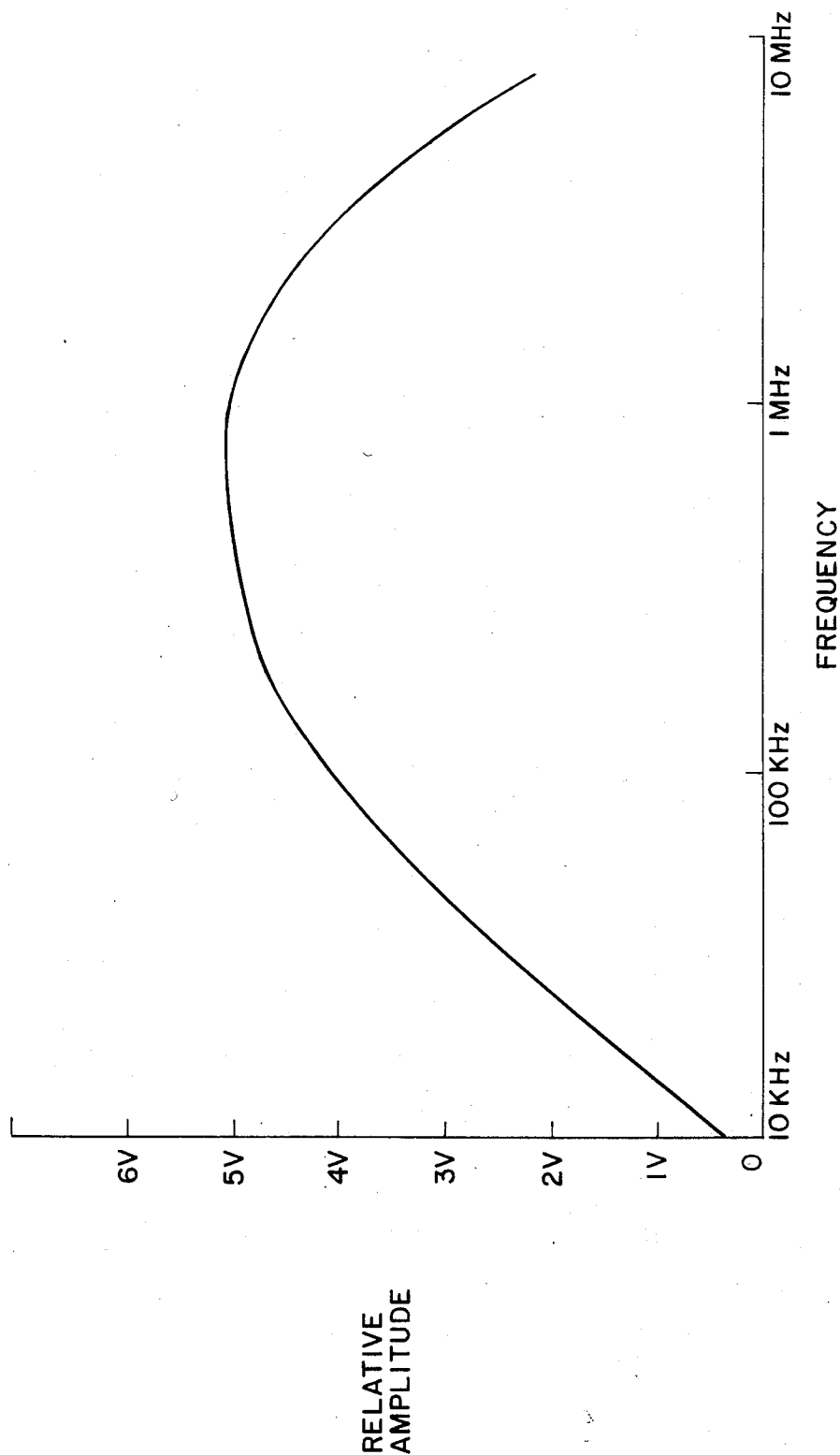
FIG. 3 shows a typical frequency bandpass characteristic curve for one embodiment of the present invention.

In FIG. 3, the bandpass characteristic for the toroid transformer 29 is shown. Note that for frequencies below 500 kHz, signals passed between the primary winding 45 and the secondary winding 51 are greatly attenuated, whereas signals having a frequency of about 1.0 MHz are passed bidirectionally with substantially little attenuation. For frequencies above 10.0 MHz the bandpass characteristic begins to significantly attenuate such higher frequency signals, as shown.

The use of ferrite material for providing the toroid core 65 ensures extremely high voltage breakdown ratings for toroid core transformer 29. For the typical example of a core 65 given above, the inventor measured an actual voltage breakdown in excess of 10,000 volts, which limit can be exceeded by changing the design specification. Accordingly, as shown in this example, utilization of a ferrite core transformer 29 provides very high electrical isolation between the primary winding 45 and secondary winding 51 of the transformer 29, very little energy transfer at power line frequencies (typically 60 Hz), low attenuation for the bidirectional flow of signals having a frequency of 1.0 MHz, and the additional benefit of relatively low cost. When the toroid core transformer 29 is used in combination with a barrier head such as barrier head 35 in this example, an intrinsic safety device is provided for coupling signals between safe and hazardous zones. Also, by properly choosing the core saturation characteristics for the toroid core transformer 29, the energy transfer per flux reversal can be effectively controlled within a range of frequency for signals being transferred.

Although one specific embodiment of the invention has been shown and described herein, it should be noted that variations in the details of the embodiment specifically illustrated described may be made without departing from the true spirit and scope of the invention as defined in the appended claims.

What is claimed is:

1. An intrinsically safe apparatus coupling electrical signals between an electronic controller located in a safe first zone, and a transducer located in a relatively unsafe second zone near the bottom of an underground storage tank containing highly combustible fluid, comprising:
    signal coupling means located near the top of said tank for both bidirectionally passing relatively high frequency (compared) with line frequency) electrical signals with substantially no attenuation, between said electronic controller and said transducer, and for substantially limiting to a safe level the energy content of any electrical signals passed from said first zone into said second zone to prevent ignition of said combustible fluid; and
    explosion proof housing means including mechanical barrier means, enclosing said signal coupling means within said mechanical barrier means between said first and second zones, physically isolating said first zone from said second zone, the combination of said housing means and said signal coupling means making said apparatus intrinsically safe, by preventing said combustible fluid and/or vapors thereof from entering said safe first zone.

2. The apparatus of claim 1, wherein said signal coupling means further includes:
    electrical isolation means for providing DC electrically isolation between said first and second zones.

3. The apparatus of claim 2, wherein said signal coupling means includes:
    transformer means including a primary winding adapted for receiving and delivering electrical signals in association with said first zone, and a secondary winding adapted for receiving and delivering electrical signals in association with said second zone.

4. The apparatus of claim 3, wherein said transformer means includes a toroid core transformer.

5. The apparatus of claim 4, wherein said toroid core transformer includes both a toroid core having a substantially high internal resistivity, and said primary and secondary winding having no direct electrical connection therebetween, for providing said electrical isolation means.

6. The apparatus of claim 5, wherein said toroid core consists of ferrite material.

7. The apparatus of claim 5, wherein said primary and secondary have a 1-to-1 turns ratio.

8. The apparatus of claim 5, wherein said mechanical barrier means of said housing means includes:
    a barrier head having a first interior cavity for containing said toroid core transformer; and
    potting material filling said cavity.

9. The apparatus of claim 8, wherein said housing means further includes:
    said barrier head having a second interior cavity connected to said first interior cavity; and
    first electrical connecting means within said second cavity for providing electrical connecting access from said first zone to the primary winding of said toroid transformer.

10. The apparatus of claim 9, wherein said barrier head is explosion proof.

11. The apparatus of claim 9, wherein said housing means further includes:
    standpipe head means for connection to a lowermost portion of said barrier head, said standpipe head means including a cavity therein; and
    second electrical connecting means within the cavity of said standpipe head means for providing electrical connecting access from said second zone to the secondary winding of said torroid transformer.

12. An intrinsically safe apparatus coupling electrical signals between an electronic controller located in a relatively safe zone, and a transducer located in a relatively unsafe zone near the bottom of a storage tank containing liquid and/or vapors prone to ignition by relatively low levels of energy, comprising;
    signal coupling means located near the top of said tank for bidirectionally passing electrical signals within a desired frequency band with substantially no attenuation, between said transducer and electronic controller, while substantially attenuating undesirable electrical signals having frequencies outside of said desired frequency band, said signal coupling means further including:

isolation means providing DC electrical isolation between said electronic controller in said safe zone and said transducer in said unsafe zone; and energy limiting means substantially limiting the level of electrical energy transferred by said signal coupling means from said electronic controller to said transducer; and housing means providing an enclosure for said coupling means, said housing means further including mechanical mounting means mounting said signal coupling means between said safe and said unsafe zone, and mechanical barrier means preventing said liquid and/or vapors in said unsafe zone from escaping into said safe zone in an area of said signal coupler receiving relatively high energy signals.

* * * * *